United States Patent Office 3,399,562
Patented Sept. 3, 1968

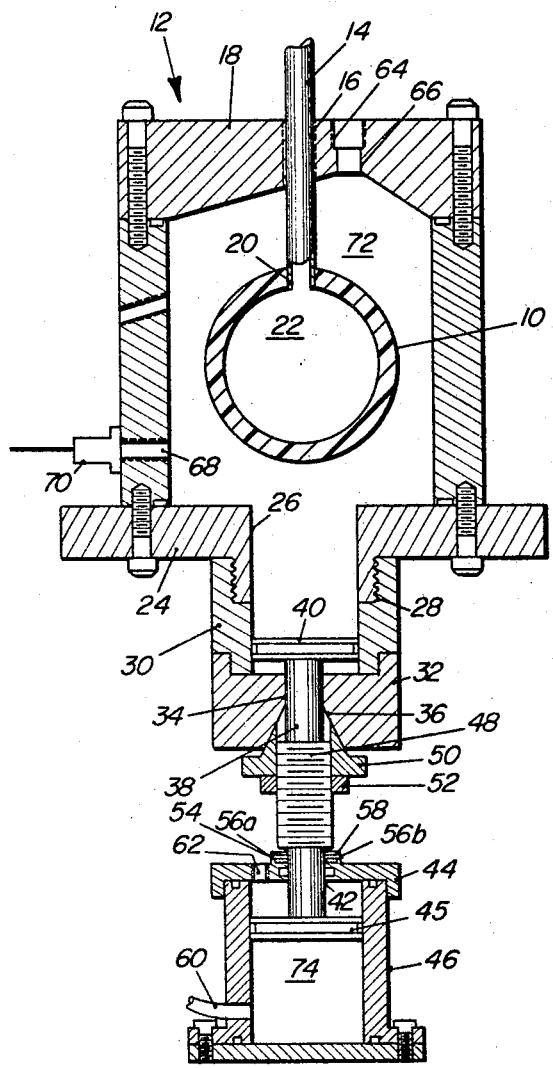

3,399,562
METHOD AND TEST ASSEMBLY FOR TESTING VISCOELASTIC MATERIALS
Sterling J. Bennett and Garren P. Anderson, Brigham City, Utah, assignors to Thiokol Chemical Corporation, Bristol, Pa., a corporation of Delaware
Filed Mar. 28, 1966, Ser. No. 537,810
5 Claims. (Cl. 73—37)

ABSTRACT OF THE DISCLOSURE

An apparatus and method for testing and determining the mechanical properties of viscoelastic materials. Included in this invention is a pressurized enclosure having means to position a hollow body specimen of the material to be tested and provision for pressurizing and therefore stressing the outside surfaces thereof. The pressurizing means is a displacement piston which is connected to a second piston in the enclosure through a control stop whereby movement of the displacement piston causes a corresponding movement of the second piston to displace fluid in the enclosure and corresponding displacement in the hollow specimen. The specimen may also be filled with fluid under pressure for stressing it in an opposite manner.

---

This invention relates to means for testing the mechanical properties of viscoelastic materials, and more particularly to a method and test assembly for testing the mechanical and failure properties of viscoelastic materials in multiaxial stress fields.

Heretofore the stress distribution and failure of solid propellant rocket grains have been predicted from an approximate relationship between the multiaxial stress field of such grains and the uniaxial stress and strain of experimentally measured specimens of the solid propellants of which particular grains are to be formed. However, the mechanical properties of a solid propellant grain under the various multiaxial stress conditions which are experienced during the operation of a rocket motor cannot adequately be predicted by approximations derived from uniaxial stress and strain tests. There has thus been an urgent need for a test method and apparatus by means of which the multiaxial mechanical properties of solid propellants can be reliably determined under conditions closely simulating actual operating conditions of rocket motors, and it is accordingly a primary object of this invention to provide such a method and apparatus.

Another object of this invention is to provide a method and test assembly for performing different tests, including relaxation, dynamic, strain rate and creep, on viscoelastic materials in multiaxial stress fields.

An additional object of this invention is to provide a method and test assembly by means of which the large deformation behavior of a solid propellant in multiaxial stress fields can be analyzed.

The above and other objects are achieved by a test method and a test assembly employing a hollow body formed of a viscoelastic material the mechanical properties of which are to be determined, pressure being applied to at least one surface of said hollow body to thereby effect its displacement. The invention will be more fully described in the following specification, in which reference is made to the accompanying drawing which is a cross-sectional view of a preferred test assembly that can advantageously be used in conducting a test of a viscoelastic material in accordance with the principles of the invention.

In the drawing, reference number 10 designates a hollow sphere formed of a viscoelastic material, such as a solid propellant, the mechanical properties of which are to be evaluated in multiaxial stress fields. Sphere 10 is positioned within an enclosure, generally designated by reference number 12, by means of a tube 14 that extends through a hole 16 in a first end wall 18 of said enclosure, the inner end of said tube being sealably engaged within a hole 20 formed in the wall of said sphere. For a reason that will appear hereinafter, in some applications of the described apparatus, the outer end of tube 14 is connected to conventional means, such as a pump (not shown), that can be operated to thereby force a suitable fluid through said tube and into the interior 22 of sphere 10.

A second end wall 24 of enclosure 12 is formed with an aperture 26 and has an integral, outwardly projecting cylindrical portion 28 to which is threadedly connected one end of a cylinder 30. Threadedly engaged with the other end of cylinder 30 is an end plate 32 having an aperture 34 therein, the outer portion 36 of said aperture being tapered as illustrated. A drive shaft 38 is slidably engaged within aperture 34 and connected at one end to a piston 40 that is in turn slidably disposed within cylinder 30. For one test configuration, a middle portion 48 of drive shaft 38 has a stop 50 and a lock nut 52 threadedly engaged thereon, the end of said stop facing end plate 32 being shaped to conformably fit within the tapered portion 36 of aperture 34. The opposite end of drive shaft 38 extends through an aperture 42 formed in an end plate 44 of a closed cylinder 46 and is fixedly connected to the piston 45 of said cylinder. A shear pin 54 is positioned within an aperture that extends transversely through drive shaft 38 adjacent lock nut 52, the end of said shear pin being respectively positioned within two holes 56a, 56b formed in an integral, cylindrical portion 58 of end plate 44. Cylinder 46 is provided with a pressurizing conduit 60 and with a vent hole 62. Enclosure 12 is also provided with a port 64 closed by a valve 66 and with an aperture 68 in which a pressure transducer 70 is fixedly mounted. Both enclosure 12 and cylinder 46 are mounted on support members (not shown) that maintain the two components in fixed position relative to each other.

In one method of using the aforedescribed test assembly, after sphere 10 has been mounted on the inner end of tube 14 (which is preferably accomplished by bonding the wall of the hole 20 in sphere 10 to the outer surface of tube 14 with a material having a modulus near that of the viscoelastic material of which sphere 10 is formed and a maximum strain capability greater than that of viscoelastic material), the tube is positioned in hole 16 in end wall 18 and the latter secured to the body of enclosure 12. Thereafter valve 66 is removed from port 64, the space 72 between sphere 10 and enclosure 12 filled with a suitable liquid such as a lightweight oil, and said valve again placed in said port. Gas is then introduced into the interior 74 of cylinder 46 through conduit 60 until the pressure against piston 45 is sufficient to shear the shear pin 54, whereupon drive shaft 38 moves rapidly toward enclosure 12 until stop 50 contacts end plate 32. It will be recognized that the travel of drive shaft 38 after shear pin 54 is sheared can readily be adjusted by turning stop 50 to thereby move it longitudinally of said drive shaft, after which adjustment lock nut 52 can be tightened against the stop to fix it in the selected position. Thus the travel of piston 40 within cylinder 30 and the change in the volume of enclosure 12 (i.e., the space within said enclosure and above piston 40 in the drawing) can conveniently be varied by adjustment of stop 50 on drive shaft 38. As the space between sphere 10 and enclosure 12 is filled with liquid the compressibility of which is negligible, the aforedescribed movement of piston 40 within cylinder 30 causes a displacement of said sphere by pressure applied uniformly against the external surface thereof. This pressure is measured by means of pressure transducer 70, the signal from which can advantageously be fed to a recorder of conventional design for readout. Furthermore, the displacement of sphere 10 as a result of the piston displacement can readily be ascertained by measuring the movement of drive shaft 38 and calculating the resultant decrease in the volume of enclosure 12. As will be understood by persons who are skilled in the art of testing the physical properties of materials, the pressure reading obtained from pressure transducer 70 and the displacement of sphere 10 can be utilized to calculate various physical constants of the viscoelastic material of which said sphere is formed, such as, for example, the relaxation modulus of said viscoelastic material. The values obtained will be for a multiaxial compressive stress condition as established by the test parameters.

An advantage of the aforedescribed test assembly is that it can be used, with only slight modification of its components, to test a viscoelastic material under a great variety of multiaxial stress conditions. For example, the arrangement of cylinder 46 and drive shaft 38 can readily be adapted to displace the surface of sphere 10 at a uniform rate. Furthermore, a liquid or gas can be injected through tube 14 while force is applied to piston 45 to thereby obtain simultaneous pressurization of the internal and external surfaces of sphere 10. In another advantageous method of using the test assembly, sphere 10 is mounted on the outer end of tube 14 (i.e., outside enclosure 12) and the interior of enclosure 12, the interior of tube 14, and the interior of sphere 10 are filled with a suitable liquid. Thereafter, the pressure against piston 45 in cylinder 46 can be increased as described hereinbefore to thereby shear the shear pin 54 and effect a rapid displacement of piston 40 within cylinder 30, whereupon the internal surface of sphere 10 will be displaced by the pressure applied internally thereto. Dynamic tests of the physical properties of the viscoelastic material of sphere 10 can also be performed by oscillating drive shaft 38, which movement of said drive shaft can be accomplished by devices of conventional design. A constant load can be applied against piston 40 and a displacement transducer connected to drive shaft 38 to record its movement, thereby making it possible to perform creep compliance tests of different viscoelastic materials. These tests, as well as others that will be obvious to persons skilled in the art of materials testing, can be made under multiaxial, uniform stress conditions, and therefore the data and physical constants obtained by use of the method and test assembly in accordance with the invention can be reliably employed by engineers and scientists who design equipment in which viscoelastic materials are subjected to multiaxial stress. The test specimen has a uniformly distributed, multiaxially applied stress that is rigorously defined mathematically, and the properties of the viscoelastic material of which the test specimen is formed can be determined in the small strain linear region of response as well as in the large deformation, maximum property and failure region of response.

Although the invention has been described by reference to a specimen of a viscoelastic material in the form of a hollow sphere, it will be understood that the invention is obviously not limited to a particular shape of a test specimen. Thus, it may in some instances be advantageous to utilize a hollow ellipsoidal test specimen so that different stress levels in the viscoelastic material under test can be obtained by application of uniform pressure against a surface thereof. In all cases, however, a hollow body of the viscoelastic material to be tested is employed in methods and test assemblies in accordance with the invention.

It will thus be seen that the objects set forth above are efficiently attained by means of the invention. Since certain changes can obviously be made in the described method and test assembly without departing from the scope of the invention (the limits of which are set out in the appended claims), it is intended that all matter contained in the above description or shown in the accompanying drawing shall be interpreted as illustrative and not in a limiting sense.

What is claimed is:

1. A test assembly for testing mechanical and failure properties of a viscoelastic material comprising, a hollow body formed of said material and displacement means for effecting a predetermined displacement of at least one surface of said hollow body to produce a stress field therein, said displacement means comprising, a walled enclosure, fluid within said enclosure, and a piston slidably mounted within said enclosure for varying the volume thereof, a tube in said enclosure extendable through a wall thereof and in sealed engagement therewith attached to said hollow body so as to provide fluid communication with the interior of said hollow body, and said fluid in said enclosure disposed in the space defined by the inner wall surfaces thereof and said hollow body outer surface.

2. The assembly of claim 1 further including a shaft attached to said displacement means piston and extending therefrom exteriorly of said enclosure through a wall thereof, a pressure cylinder having an end in shaft receiving relationship with said enclosure, a second piston slidably disposed in said cylinder attached to said shaft extending from said displacement means piston, and means for admitting pressurizing fluid from an external source into said cylinder for initiating sliding motion of said second piston and said shaft.

3. The assembly of claim 2 wherein the shaft has a threaded middle portion, a stop nut and means for limiting the sliding motion of said pistons threadedly engaged thereon whereby the volume of said enclosure is varied a predetermined amount.

4. The assembly of claim 3 wherein said cylinder includes venting means for facilitating sliding motion of said pistons and shaft.

5. The assembly of claim 3 wherein said cylinder shaft receiving end and said shaft have associated therewith means defining a transverse hole through the shaft and in said shaft receiving end of said cylinder, and a shear pin positioned in said shaft and cylinder end holes for preventing sliding motion of said pistons until a predetermined pressure is reached in said cylinder.

References Cited

UNITED STATES PATENTS

| | | | |
|---|---|---|---|
| 2,725,742 | 12/1955 | Crooks | 73—88 |
| 2,754,677 | 7/1956 | New | 73—37 |
| 3,165,917 | 1/1965 | Wogsland | 73—37 |

S. CLEMENT SWISHER, *Acting Primary Examiner.*

WILLIAM A. HENRY II, *Assistant Examiner.*